A. B. DAY.
MINING CAR WHEEL.
APPLICATION FILED JAN. 28, 1914.
1,109,906.
Patented Sept. 8, 1914.
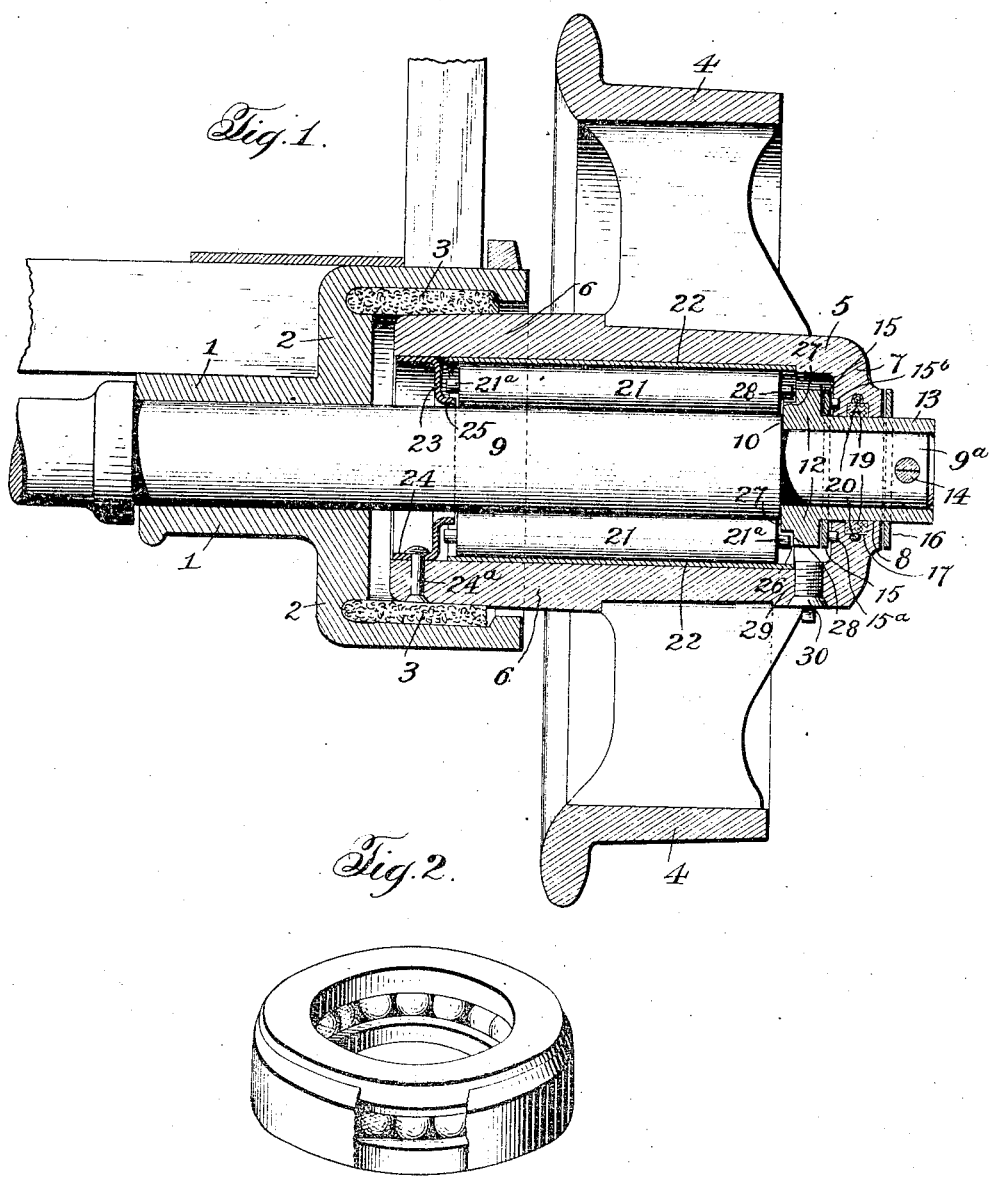
Witnesses:
Jas. E. Hutchinson
H. N. Ramsey
Inventor
Alfred Bryant Day,
Bacon & Milans, Attorneys

UNITED STATES PATENT OFFICE.

ALFRED BRYANT DAY, OF KNOXVILLE, TENNESSEE.

MINING-CAR WHEEL.

1,109,906.　　　Specification of Letters Patent.　　Patented Sept. 8, 1914.

Application filed January 28, 1914. Serial No. 814,879.

*To all whom it may concern:*

Be it known that I, ALFRED BRYANT DAY, citizen of the United States, residing at Knoxville, in the county of Knox and State of Tennessee, have invented certain new and useful Improvements in Mining-Car Wheels, of which the following is a specification, reference being had therein to the accompanying drawing.

This invention relates to improvements in car wheels, and has to deal more particularly with wheels designed for mining car service, though not limited to this use.

The primary object of the invention is to reduce to a minimum, the friction and incident wear between the wheel hub and its associated parts. It is a matter of common knowledge that in structures of the character under consideration, wherein the wheels are loosely mounted upon the axle, the end thrust on the wheel in rounding curves is considerable, and it has been suggested to take care of this end thrust in different ways, usually by allowing the inner end of the hub to contact with the side of the pedestal box, or to provide an abutment on the inner surface of the hub cap with which the end of the axle would contact. In either case, the construction has not proven altogether satisfactory, since, in the first mentioned type of wheel, considerable friction between the hub and pedestal resulted in a great deal of objectionable wear at this point, whereas the same objection to friction and wear was manifest in that type of construction wherein the axle abutted against the end of the hub. It has also been proposed to provide a shoulder or the like on the hub, adjacent its outer end, and to turn down the end of the axle to a relatively small diameter to provide a shoulder on the axle to engage the end of the hub. When relatively small axles are employed, this shoulder on the axle will, of necessity, be very small, or else the smaller diameter of the end of the axle would be devoid of the necessary strength to withstand the wear and strain.

The above and other objections incident to the use of prior constructions along this line have led to the present invention, which, generally speaking, involves novel, efficient, and economical means for providing against the friction and wear of the hub and pedestal due to the end thrust of the wheel, especially in going around curves.

In carrying out the invention, I provide means for spacing the ends of the hub from the pedestal, and axle, and interpose between the hub and axle means to receive the end thrust in both directions, thereby rendering the hub substantially devoid of friction and wear.

In carrying out the invention, I provide means on the axle to engage a projection at the outer end of the hub, for instance, the hub cap, whereby to receive the inner end thrust of the hub.

Further, the invention includes a collar or thimble positioned on the axle upon which the outer end of the hub is sleeved, for receiving wear at this point.

With more particularity, the invention embraces a hub with an opening in the cap thereof, a tubular member sleeved upon the axle, which latter projects through the cap opening, means for resisting end thrust of the hub in one direction, and means on said tubular member overlying the inner surface of the hub cap for resisting end thrust in an opposite direction.

Still further, the invention contemplates, in combination with the above, a friction receiving part interposed between said overlying projection of the tubular member and hub cap.

Various other improvements and novel details in construction and arrangement of parts will be more particularly referred to in the detailed description to follow, which, for a clear understanding of the invention, should be considered in connection with the accompanying drawings forming a part hereof, and wherein are disclosed, for the purpose of illustration, convenient and satisfactory embodiments of the invention.

In the drawings:—Figure 1 is a longitudinal vertical section of a wheel and associated parts, constructed in accordance with my invention. Fig. 2 is a detail view enlarged of a modified form of washer.

With more particular reference to the drawings, wherein like reference characters refer to corresponding parts throughout the several views, 1 is a pedestal member having an annular hub receiving part 2, the inner surface of the wall of the hub receiving part being constructed to form an annular pocket or receiving chamber for a suitable packing such as a felt 3. A wheel 4 has a suitable hub 5, which hub may, if desired, be integral with the wheel, and an inward projection 6 of the hub being adapted to rest within the hub receiving part of the pedestal in engagement with the packing 3, and otherwise spaced throughout from the wall of the hub receiving part. The hub 5 conveniently has an integral cap member 7, with an axle opening or recess 8.

9 is an axle preferably fixed against rotation and projecting through the hub receiving part of the pedestal, thence through the hollow hub to a point beyond the cap thereof. The projecting end $9^a$ of the axle has a reduced diameter relative to the body thereof, and the diameter of the projection $9^a$ is less than the diameter of the opening 8 of the hub cap, thereby providing an intervening space. The body portion of the axle at its point of juncture with the projecting end thereof, of reduced diameter, provides a shoulder 10 spaced inwardly from the inner surface of the hub cap. Positioned on the axle in the space between the shoulder 10 and inner surface of the hub cap 7 is a suitable member or members for receiving the end thrust of the wheel hub in an inward direction. The said member preferably takes the form of an annular collar 12, of metallic formation, and this collar may have a tubular body part 13 of a length to project through the hub cap to a point adjacent the end of the axle, and substantially filling the space between the wall of the opening 8 and the periphery of the axle.

A common means preferably performs the double function of securing the collar 12 to the axle and providing for the end thrust of the wheel in an outward direction, the said means taking the form of a suitable detachable pin 14 projecting through the axle and tubular part 13 of the collar 12, and overlying the outer surface of the hub cap. From the construction thus described it will be appreciated that the hub is spaced from the axle as well as the pedestal member throughout, thus overcoming the usual friction between these parts. I also preferably interpose between the annular collar 12 and hub cap 7 a suitable friction receiving part 15 conveniently taking the form of a metallic disk-shaped washer. It has been seen that the collar 12 is secured through its tubular extension 13 to the axle and therefore will remain stationary relative to the rotatable wheel sleeved upon the axle, and if desired, suitable means may be provided for removably securing the washer to one of the parts comprising the hub and collar. In the preferred construction, the collar is removably secured to the hub cap through the medium of one or more pins or dowels $15^a$ adapted to fit within recesses $15^b$ in the inner face of the hub cap. By this means the collar is adapted to rotate with the wheel hub, and any friction at this point will take place between the adjacent surfaces of the collar 12 and washer 15. A similar collar or washer 16 is preferably loosely positioned on the tubular extension 13 to the outside of the hub cap and at a point between said hub cap and the securing pin 14. This collar forms a friction receiving element for the outer surface of the hub cap in the outward thrust of the wheel. The hub cap is preferably provided with an annular recess 17 adapted to receieve a suitable packing, such as felt, 19, conveniently held in place in any desired manner as by a spiral spring 20.

Roller bearings 21 are preferably arranged in the space between the hub and axle and the inner surface of the hub conveniently has a removable lining 22 to be engaged by the rollers. The rollers have at opposite ends, projecting pintles $21^a$. A suitable collar 23 having an annular flange 24 is secured to the inner surface of the hub adjacent its inner end as by bolts $24^a$, and an offset annular flange 25 adapted to overlap the projecting pintles of the rollers at this end. I preferably take advantage of the annular collar 12 for supporting the opposite end of the rollers, and to this end I form an annular cut out part 26 forming a shoulder or abutment 27 for the end of the rollers, and a shoulder or abutment 28 for the end of the pintles.

One or more lubricating openings 29 may be provided, as desired, the same being normally closed by threaded nuts 30.

The construction and operation of the device, from the description, when considered in connection with the accompanying drawings, is believed to be clear. It will be seen that the wheel may be readily removed, and this without displacing the rollers, by simply removing the securing pin 14. When in position on the axle the wheel hub is devoid of all frictional contact with either the axle or pedestal member, the end thrust of the hub being taken care of in one direction through the medium of the securing pin 14 and washer 16, and in an opposite direction by the washer 15 and collar 12. Either washer 15 or 16, or the thimble comprising the collar 12 and tubular extension 13 may be removed at will and replaced as occasion demands.

It may be desirable in some instances to provide in lieu of the washers 15 and 16, a suitable anti-friction and thrust bearing, such as illustrated in the modified type of washer disclosed in Fig. 2.

Still further minor changes may be made in the arrangement and construction of parts without departing from the spirit of the invention.

I claim:—

1. In a wheel construction, the combination of a pedestal member having a hub receiving part, a wheel having a hub with a portion positioned within the hub receiving part of the pedestal and having an opening in its cap, an axle projecting through the hub and through the end opening thereof, and a thimble sleeved upon the axle and secured thereto and having means engaging the hub cap.

2. In a wheel construction, the combination of a pedestal member, a wheel, a hub for the wheel, an axle projecting from the pedestal and through the hub, a collar interposed between the axle and hub cap and projecting through the latter, and means for securing the collar to the axle.

3. In a wheel construction, the combination of an axle, a wheel having a hub rotatably mounted on the axle, means for resisting end thrust of the hub in one direction, and means for resisting said end thrust in an opposite direction, including an annular collar secured to the axle and overlying the inner face of the hub cap, the hub cap overlying and having a sleeved engagement with said collar.

4. In a wheel construction, the combination of an axle, a wheel having a hub rotatably mounted on the axle, means for resisting end thrust of the hub in one direction, and means for resisting said end thrust in an opposite direction, including an annular collar secured to the axle and overlying the inner face of the hub cap, and a friction receiving member interposed between said collar and said inner face of the cap.

5. In a wheel construction, the combination of a pedestal, a wheel having a hub part loosely positioned in the pedestal, an axle, the hub being loosely sleeved upon the axle for rotatable movement, the axle projecting through the hub cap, means positioned on the axle to the outside of the hub cap for resisting the end thrust movement in one direction, and means detachably secured to the axle and having an abutting part arranged to the inside of the hub cap for resisting the end thrust in an opposite direction.

6. In a wheel construction, the combination of a wheel and its hub, an axle upon which the wheel is loosely mounted for rotation, a tubular member positioned on the axle and secured thereto, the end of the hub being loosely sleeved upon said tubular member.

7. In a wheel construction, the combination of a wheel and its hub, an axle upon which the wheel is loosely mounted for rotation, a tubular member positioned on the axle and secured thereto, the end of the hub being loosely sleeved upon said tubular member, and the end of the hub having an annular oil chamber.

8. In a wheel construction, the combination of a wheel and its hub, an axle upon which the wheel is loosely mounted for rotation, a tubular member positioned on the axle and secured thereto, the end of the hub being loosely sleeved upon said tubular member, the end of the hub having an annular oil chamber, and a suitable packing positioned in said chamber to engage said tubular member.

9. In a wheel construction, the combination of a wheel and its hub, an axle upon which the wheel is loosely mounted for rotation, a tubular member positioned on the axle and secured thereto, the end of the hub being loosely sleeved upon said tubular member, the end of the hub having an annular oil chamber, a suitable packing positioned in said chamber to engage said tubular member, and spring supporting means for said packing.

10. In a wheel construction, the combination of a wheel and its hub, an axle upon which the wheel is loosely mounted for rotation, a tubular member positioned on the axle and secured thereto, the end of the hub being loosely sleeved upon said tubular member, said tubular member having an annular projection overlying the inner face of the hub cap.

11. In a wheel construction, the combination of a wheel and its hub, an axle upon which the wheel is loosely mounted for rotation, a tubular member positioned on the axle and secured thereto, the end of the hub being loosely sleeved upon said tubular member, said tubular member having an annular projection overlying the inner face of the hub cap, and a friction receiving member interposed between said projection and the inner face of the cap.

12. In a wheel construction, the combination of a wheel and its hub, an axle upon which the wheel is loosely mounted for rotation, a tubular member positioned on the axle and secured thereto, the end of the hub being loosely sleeved upon said tubular member, said tubular member having an annular projection overlying the inner face of the hub cap, a friction receiving member interposed between said projection and the inner face of the cap, and an auxiliary friction receiving member positioned on the tubular member to engage the outer surface of said cap.

13. In a wheel construction, the combination of a wheel and its hub, an axle upon which the wheel is loosely mounted for rotation, a tubular member positioned on the axle and secured thereto, the end of the hub being loosely sleeved upon said tubular member, an annular part on said tubular member of relatively larger diameter adapted to overlie a projecting part on the hub to receive the end thrust of the hub in one direction.

14. In a wheel construction, the combination of a wheel and its hub, an axle upon which the wheel is loosely mounted for rotation, a tubular member positioned on the axle and secured thereto, the end of the hub being loosely sleeved upon said tubular member, an annular part on said tubular member of relatively larger diameter adapted to overlie a projecting part on the hub to receive the end thrust of the hub in one direction, and a friction receiving member interposed between said annular part and said projecting part of the hub.

15. In a wheel construction, the combination of a wheel and its hub, an axle upon which the wheel is loosely mounted for rotation, a tubular member positioned on the axle and secured thereto, the end of the hub being loosely sleeved upon said tubular member, the tubular member having an enlarged annular part to overlie the inner surface of the hub cap, and a reduced flange to receive one end of a series of roller bearings interposed between the hub and axle, the said bearings, and a support for opposite ends of the bearings.

16. In a wheel construction, the combination of a wheel and its hub, the cap of the hub having an opening therethrough, an axle upon which the hub is loosely mounted for rotation, a removable tubular member sleeved upon the end of the axle and positioned between the axle and wall of the hub cap surrounding the opening, and a securing pin outside of the hub for securing the tubular member to the axle.

17. In wheel construction, the combination of a wheel and its hub, the cap of the hub having an opening therethrough, an axle upon which the hub is loosely mounted for rotation, a removable tubular member sleeved upon the end of the axle and positioned between the axle and wall of the hub cap surrounding the opening, a securing pin outside of the hub for securing the tubular member to the axle, and a washer interposed between the pin and outer end of the hub.

18. In a wheel construction, the combination of a wheel and its hub, the cap of the hub having an opening therethrough, an axle upon which the hub is loosely mounted for rotation, a tubular member sleeved upon the end of the axle and positioned between the axle and wall of the hub cap surrounding the opening, and a securing pin outside of the hub for securing the tubular member to the axle, said tubular member having an enlarged annular part at its inner end to engage over the inner surface of the hub cap.

19. In a wheel construction, the combination of a wheel and its hub, the cap of the hub having an opening therethrough, an axle upon which the hub is loosely mounted for rotation, a tubular member sleeved upon the end of the axle and positioned between the axle and wall of the hub cap surrounding the opening, a securing pin outside of the hub for securing the tubular member to the axle, said tubular member having an enlarged annular part at its inner end to engage over the inner surface of the hub cap, and a friction receiving part interposed between said annular part and hub cap.

20. In a wheel construction, the combination of a wheel and its hub, the cap of the hub having an opening therethrough, an axle upon which the hub is loosely mounted for rotation, a tubular member sleeved upon the end of the axle and positioned between the axle and wall of the hub cap surrounding the opening, a securing pin outside of the hub for securing the tubular member to the axle, said tubular member having an enlarged annular part at its inner end to engage over the inner surface of the hub cap, and a friction receiving part interposed between said annular part and hub cap, said friction receiving member being removable.

21. In a wheel construction, the combination of a wheel and its hub, the hub cap having an opening therethrough, an axle upon which the wheel is loosely mounted for rotation projecting through the opening in the hub member, a securing pin projecting through the axle and overlying the hub cap, said axle having a shoulder portion adjacent the inner surface of the hub cap, and friction receiving means interposed between said shoulder and the inner surface of the hub cap, said means including an annular collar positioned on the axle.

In testimony whereof I affix my signature in presence of two witnesses.

ALFRED BRYANT DAY.

Witnesses:
A. D. JOHNSON,
J. FRANK DISNEY.